US011271420B2

(12) United States Patent
Dudar et al.

(10) Patent No.: US 11,271,420 B2
(45) Date of Patent: Mar. 8, 2022

(54) JUMP START DRONE

(71) Applicant: Ford Global Technologies, LLC, Dearborn, MI (US)

(72) Inventors: Aed M. Dudar, Canton, MI (US); Kenneth James Miller, Canton, MI (US); Douglas Raymond Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 283 days.

(21) Appl. No.: 16/482,781

(22) PCT Filed: Feb. 3, 2017

(86) PCT No.: PCT/US2017/016352
§ 371 (c)(1),
(2) Date: Aug. 1, 2019

(87) PCT Pub. No.: WO2018/144000
PCT Pub. Date: Aug. 9, 2018

(65) Prior Publication Data
US 2019/0348857 A1 Nov. 14, 2019

(51) Int. Cl.
*G05B 19/18* (2006.01)
*H02J 7/14* (2006.01)
*B64C 39/02* (2006.01)
*H02J 1/10* (2006.01)

(52) U.S. Cl.
CPC .............. *H02J 7/14* (2013.01); *B64C 39/024* (2013.01); *B64C 2201/027* (2013.01); *B64C 2201/126* (2013.01); *B64C 2201/127* (2013.01); *H02J 1/122* (2020.01)

(58) Field of Classification Search
None
See application file for complete search history.

(56) References Cited

U.S. PATENT DOCUMENTS 5,635,817 A * 6/1997 Shiska ................... H02G 11/02
320/105
8,860,362 B2 10/2014 Kamen et al.
9,056,676 B1 6/2015 Wang
9,282,430 B1 * 3/2016 Brandmaier ........... G06Q 10/06
(Continued)

FOREIGN PATENT DOCUMENTS

DE 102014213023 A1 1/2016
DE 102015007156 B4 * 11/2020 ............. B60R 25/20
EP 2589463 B1 * 10/2015 ......... B24B 27/0015

OTHER PUBLICATIONS

Scott Edwards, "Starting Car with Hobby Battery Hack", YouTube Video retrieved from Internet URL: https://www.youtube/WFhwNz1088U, published May 13, 2016 (3 pages).
(Continued)

*Primary Examiner* — Jelani A Smith
*Assistant Examiner* — Davin Seol
(74) *Attorney, Agent, or Firm* — Brandon Hicks; Bejin Bieneman PLC

(57) ABSTRACT

A system includes an aerial drone. The aerial drone includes first and second electrically conductive end effectors. The first and second electrically conductive end effectors are electrically connected to a power source.

17 Claims, 8 Drawing Sheets

(56) References Cited

U.S. PATENT DOCUMENTS

| | | | |
|---|---|---|---|
| 9,307,383 B1 | 4/2016 | Graham | |
| 9,505,494 B1 | 11/2016 | Marlow et al. | |
| 9,778,653 B1 * | 10/2017 | McClintock | B60L 53/65 |
| 10,011,352 B1 * | 7/2018 | Dahlstrom | B64C 39/024 |
| 2009/0088915 A1 * | 4/2009 | Kizaki | B60L 50/51 |
| | | | 701/22 |
| 2012/0005031 A1 | 1/2012 | Jammer | |
| 2013/0325181 A1 | 12/2013 | Moore | |
| 2015/0336677 A1 | 11/2015 | Smaoui et al. | |
| 2016/0001666 A1 | 1/2016 | Nook et al. | |
| 2016/0016663 A1 | 1/2016 | Stanek et al. | |
| 2016/0082460 A1 | 3/2016 | McMaster et al. | |
| 2016/0196756 A1 * | 7/2016 | Prakash | G08G 5/025 |
| | | | 701/3 |
| 2016/0221688 A1 | 8/2016 | Moore | |
| 2016/0272317 A1 | 9/2016 | Cho et al. | |
| 2016/0332748 A1 | 11/2016 | Wang | |
| 2017/0252922 A1 * | 9/2017 | Levine | G06N 3/08 |
| 2020/0122331 A1 * | 4/2020 | Jules | B25J 9/1671 |

OTHER PUBLICATIONS

Notification of Transmittal of International Search Report and Written Opinion dated Apr. 20, 2017 regarding International Application No. PCT/US2017/016352 (16 pages).

* cited by examiner

JUMP START DRONE

BACKGROUND

Vehicles relying on an internal combustion engine may require an alternate source of electricity when an onboard electric power source, such as a battery, is inadequate to actuate a starter motor of the vehicle. For example, electricity may be provided via a "jump start," e.g. a user connecting the onboard electrical source to an alternate electrical power source, such as a battery of another vehicle. However, in many situations, jump starts are currently unavailable.

DETAILED DESCRIPTION

Introduction

Figure 1:
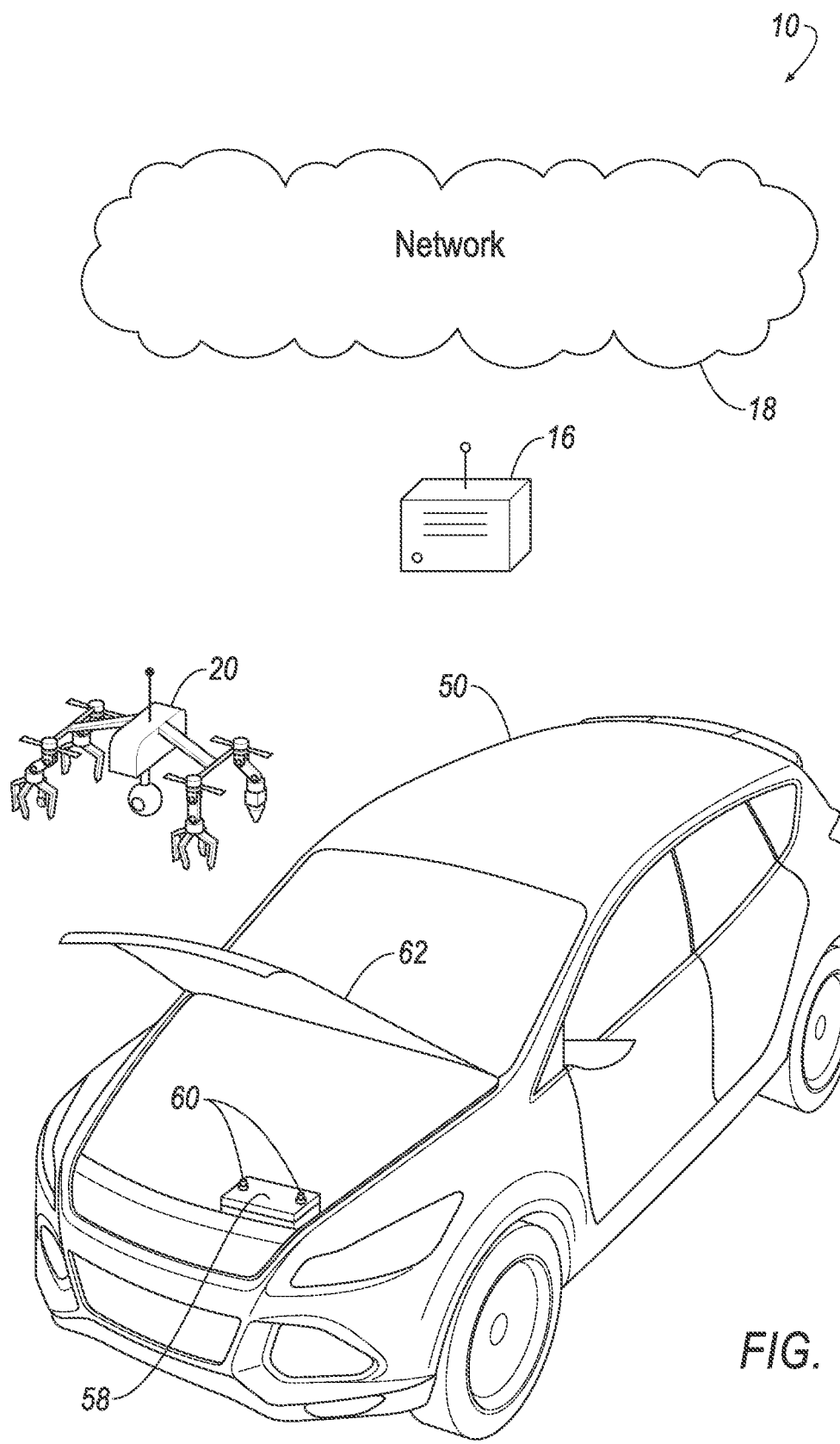
FIG. 1 is a perspective view of an example jump start delivery system.
Figure 2:
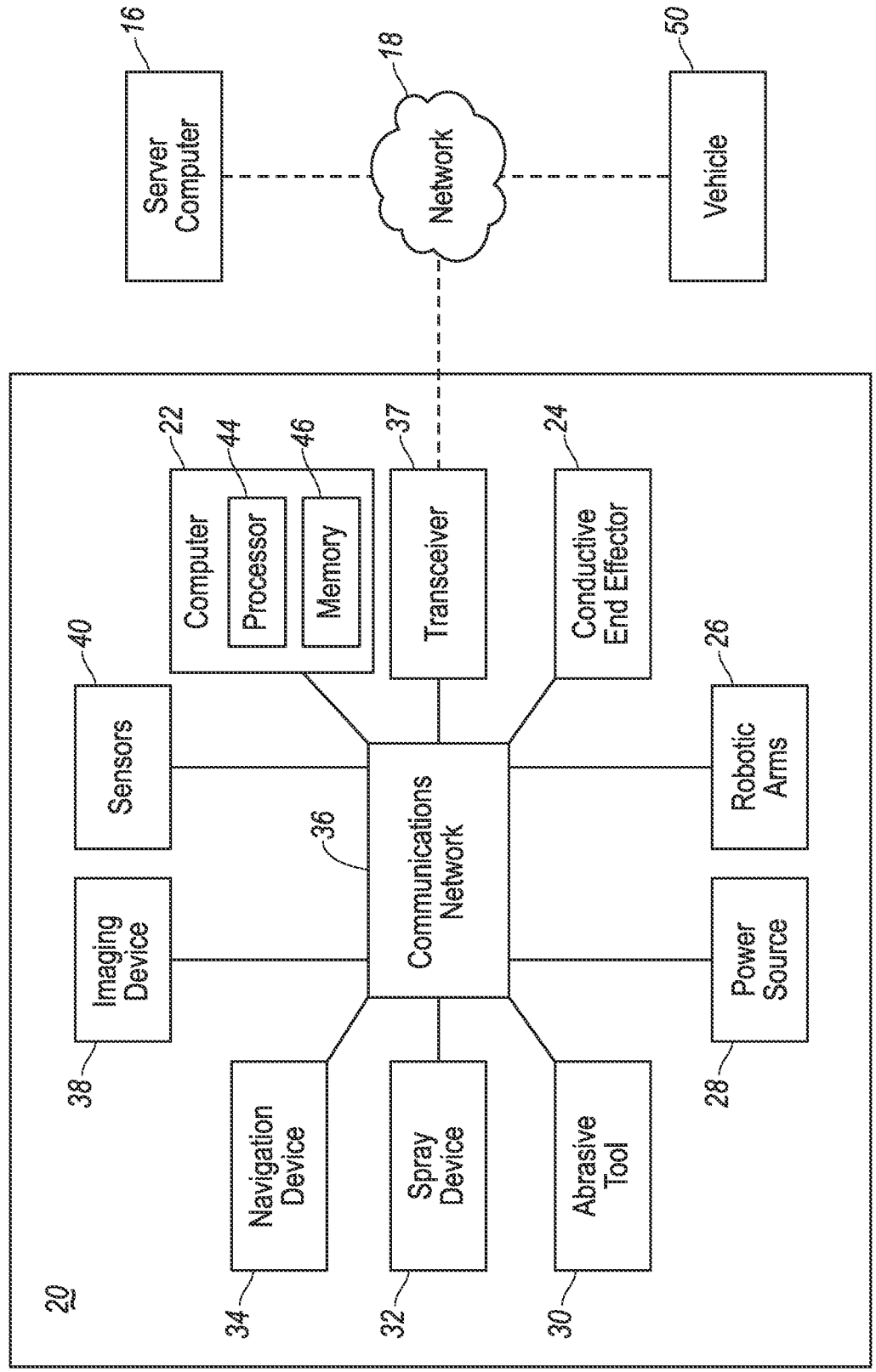
FIG. 2 is a block diagram of elements of the system of FIG. 1, including details of the example aerial drone of FIG. 1.

With reference to the Figures, wherein like numerals indicate like parts throughout the several views, a vehicle jump start system 10 provides a vehicle 50 with a dead battery with an electric power source (see FIGS. 1-4), even if none is available at a location of the vehicle 50. Accordingly, the vehicle jump start system 10 includes an aerial drone 20 including first and second electrically conductive end effectors 24 electrically connected to a power source 28. The system 10 further includes a drone computer 22 programmed to apply a load voltage to a vehicle 50 via the first and second electrically conductive end effectors 24 mounted to the aerial drone 20. The system 10 further includes a vehicle computer 66 programmed to send a jump start request. The jump start request may include a location of the vehicle 50 and charge point specifications.

System

As shown in FIGS. 1-4, a jump start system 10 includes an aerial drone 20 and a vehicle 50. The drone 20 and the vehicle 50 can communicate with one another and with a remote server computer 16, sometimes referred to as a cloud server, indirectly via a network 18 and/or directly e.g., via radio frequency (RF) communications.

The server computer 16 is a computing device that includes hardware, e.g. circuits, chips, antenna, etc., programmed to transmit, receive, and process information, to and from the drone 20 and the vehicle 50, e.g., via the network 18. The server computer 16 includes a processor and a memory implemented in a manner as described below for a processor 44 and memory 46. For example, the server computer 16 may be programmed to process and relay information and communications, e.g. to receive a jump start request from the vehicle 50, and transmit the jump start request to the drone 20. The server computer 16 may store identification information and location information for specific drones in a fleet of drones, e.g., in a drone fleet database. The server computer 16 may determine which drone 20, e.g., out of the fleet of drones at various locations, to send the jump start request to, e.g., based on a location of the drone 20 relative to a location of the vehicle 50 where the selected drone 20 is the closest drone 20 to the vehicle 50. The server computer 16 may be programmed to perform the processes described herein. The server computer 16 may use any suitable technologies, including those discussed herein.

The network 18 represents one or more mechanisms by which a vehicle computer 66 may communicate with remote devices, e.g., the server computer 16 and the drone 20. Accordingly, the network 18 may include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The Aerial Drone

Figure 3:
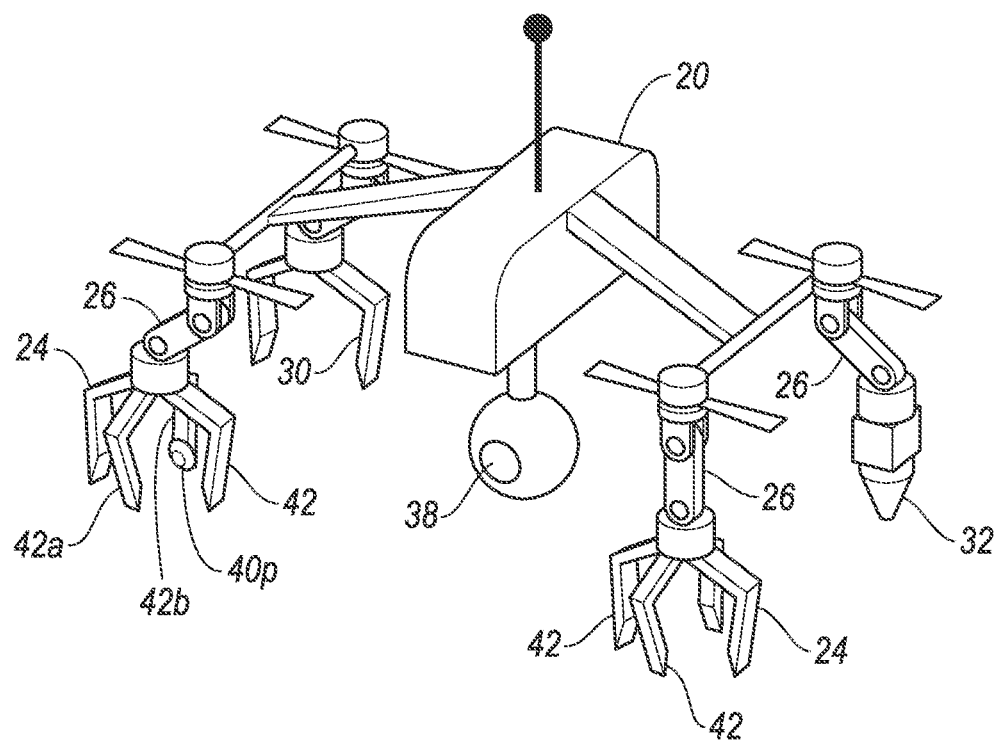
FIG. 3 is a front perspective view of the example aerial drone of FIG. 1.
Figure 4:
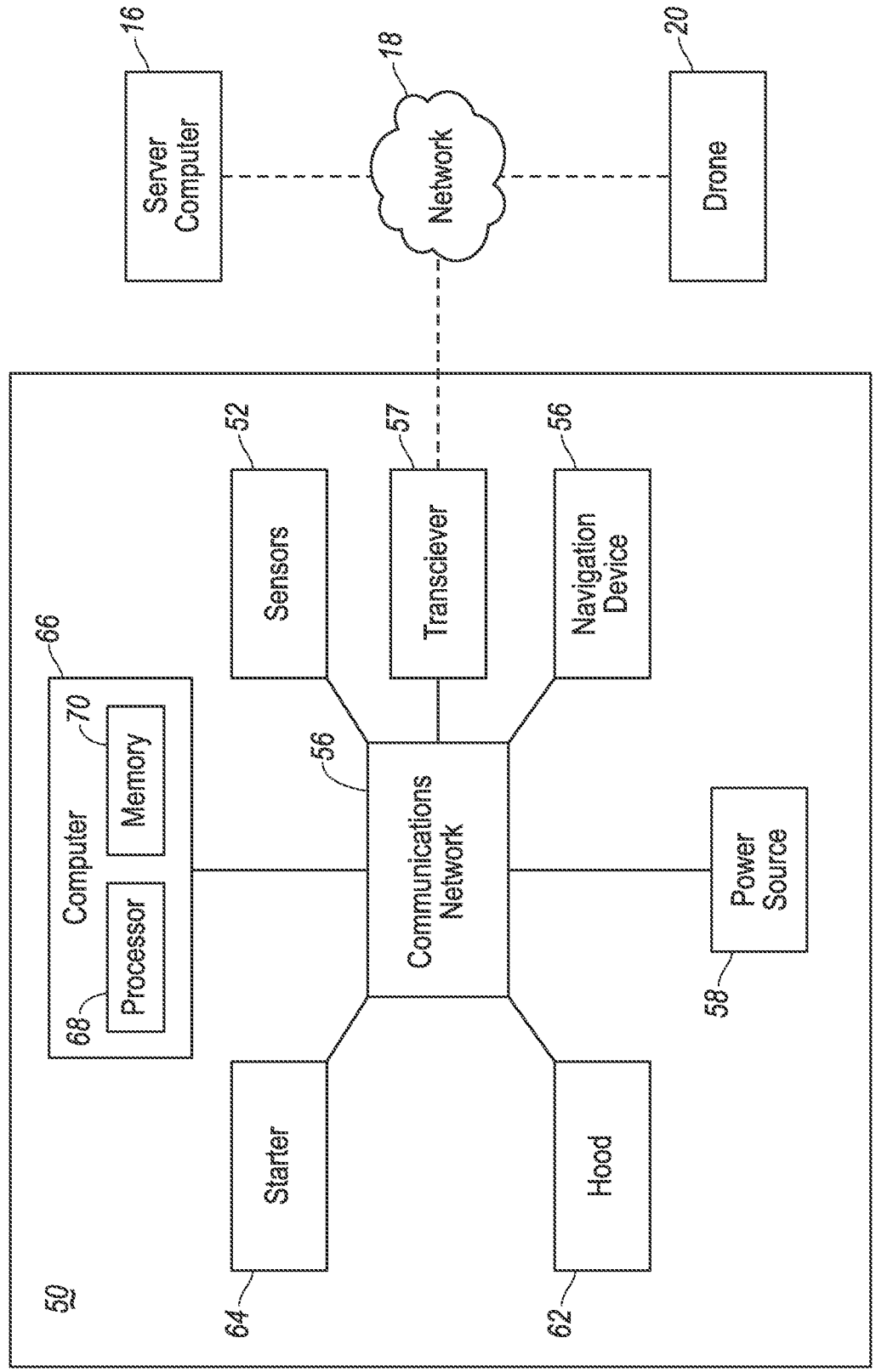
FIG. 4 is a block diagram of elements of the system of FIG. 1, including details of the example vehicle of FIG. 1.

Referring to FIGS. 3 and 4, the aerial drone 20 is an unmanned aerial vehicle and includes a computing device, such as a drone computer 22, that may include a number of circuits, chips, or other electronic components that can control various operations of the aerial drone 20. For instance, the aerial drone 20 may fly in accordance with control signals output to its propeller motors. Components of the aerial drone may include first and second electrically conductive end effectors 24, a plurality of robotic arms 26, a drone power source 28, an abrasive tool 30, a spray device 32, a drone navigation device 34, a drone communications network 36, a drone transceiver 37, an imaging device 38, and one or more drone sensors 40. The components of the aerial drone 20 may be mounted on, or within, a main body of the aerial drone 20. The main body may include an internal or external support frame, a housing, etc.

The first and second electrically conductive end effectors 24 can provide a load voltage to the vehicle 50 to allow the vehicle 50 battery to store electricity, e.g., to start an internal combustion engine of the vehicle 50, e.g., to use the drone 20 as a power source for what is known as a "jump start." The end effectors 24 may include a number of circuits, chips, computing devices, or other electronic components that can control various operations of the end effectors 24, such as in response to a command from the computer 22. For example, the first and second electrically conductive end effectors 24 may be in electrical communication with, i.e., are electrically connected to, the drone power source 28 and/or the drone computer 22, e.g., electricity may flow from the drone power source 28 to the end effectors 24 upon actuation by the drone computer 22.

The first and second electrically conductive end effectors 24 may include claws 42, such as a first claw 42a and a second claw 42b. In this example, the end effectors 24 may be referred to as "grippers," and the claws 42 may actuate between an open position and a closed position, such as, to grip a terminal of a battery. Accordingly, the first and second electrically conductive end effectors 24 may include various drive mechanisms, such as known hydraulic and electro-mechanical mechanisms that utilize piston and cylinder arrangements, servos, motors, chain and sprocket drives, belt and pulley drives, rack and pinion drives, linear actuators, etc., to provide movement of the first claw 42a and the second claw 42b. The first claw 42a may be made, at least in part, of an electrically conductive material. For example, the first claw 42a may be made of a solid copper structure, a plastic core with a copper shell, etc. The first claw may be in electrical communication with the drone power source 28 and/or the drone computer 22, thereby providing such electrical communication for the electrically conductive end effector 24.

The second claw 42b may support a tactile sensor 40p, such as a hermetically sealed pressure sensor. The tactile sensor 40p may be positioned on the second claw 42b to measure a grip force of the end effector 24, e.g., the tactile sensor 40p may be mounted on an inside face of the second claw 42b such that the tactile sensor 40p is compressed by the first claw 42a when the first claw 42a is actuated to the closed position.

The electrically conductive end effectors 24 may be mounted to the main body of the drone 20, e.g., via robotic arms 26. For example, one end of the robotic arm 26 may be connected to the main body, and an opposite end of the robotic arm 26 may be connected to one of the electrically conductive end effectors 24, e.g., as an end effector of the robotic arm 26. The robotic arms 26 may include one or more link members connected by a pivoting or rotating hinge. The robotic arms 26 may include various drive mechanisms, such as known hydraulic and electro-mechanical mechanisms that utilize piston and cylinder arrangements, servos, motors, chain and sprocket drives, belt and pulley drives, rack and pinion drives, linear actuators, etc., to provide movement to the robotic arms 26. The robotic arms 26 may include a number of circuits, chips, computing devices, or other electronic components that can control various operations of the robotic arms 26, such as actuation of the various drive mechanisms in response to a command from the drone computer 22.

The drone power source 28 provides a load voltage sufficient to jump start the vehicle 50, e.g., 400 amps at 12 volts. The drone power source 28 may be a battery, such as a lithium-ion polymer battery, a nickel-metal hydride battery, etc. The drone power source 28 may be a capacitor. The drone power source 28 may provide electricity to navigate the aerial drone 20, such as proving power to the propeller motors, to move the robotic arms 26 and operate the various end effectors, such as the electrically conductive end effectors 24, etc.

The abrasive tool 30 may be actuated to clean charge points 60 of the vehicle 50, for example to remove corrosion and provide a sufficient electrical connection between the aerial drone 20 and the vehicle 50 for transmission of electricity to the vehicle 50 power source 58. Example abrasive tools 30 include a wire brush, a wire wheel, an end effector with an abrasive surface, e.g., a filing and/or scraping tool, etc. The abrasive tool 30 may be mounted to the main body of the drone 20, e.g. via one of the robotic arms 26. For example, one end of the robotic arm 26 may be connected to the main body, and an opposite end of the robotic arm may be connected to the abrasive tool 30 as an end effector of the robotic arm 26, similar to the electrically conductive end effectors 24 discussed above.

The spray device 32 provides a spray of fluid, such as a fluid configured to remove corrosion from, and/or build-up of material on, a battery terminal. The fluid may be stored under pressure within the spray device 32. Upon actuation of the spray device 32 the pressurized fluid may spray from a nozzle of the spray device 32, e.g., via actuation of a valve within the spray device 32 from a closed position to an open position in response to a command from the drone computer 22. The spray device 32 may be mounted to the main body of the drone 20, e.g., via one of the robotic arms 26. For example, one end of the robotic arm 26 may be connected to the main body, and an opposite end of the robotic arm may be connected to the spray device 32, e.g., as an end effector of the robotic arm 26, similar to electrically conductive end effectors 24 discussed above.

The drone navigation device 34 determines a location of the drone 20 relative to stored map data. Map data may include roads and related data, such as buildings, towers, no fly zones, etc. To determine the location, the drone navigation device 34 may rely on information from a global navigation satellite system, distance data from drone sensors 40, a gyroscope, and/or an accelerometer. The map data may be stored locally, such as on the drone memory 46, or on the drone navigation device 34. Additionally or alternatively, the map data may be stored on a remote computer or network, accessible via the drone 20 communications network 36. Example drone navigation devices 34 include known GPS (global positioning system) navigation devices.

The drone 20 communications network 36 includes hardware, such as an antenna, circuits, chips, etc., for facilitating wired or wireless communication among drone components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The drone transceiver 37 transmits and receives information wirelessly from other transceivers, enabling signals, data and other information to be exchanged with other computer and network systems. The transceiver is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers. The transceiver may communicate with other vehicles and devices, e.g., the vehicle 50 and the server computer 16, etc., directly, such as via RF communications, and/or indirectly, such as via the network 18.

The drone imaging device 38 may include one or more of a digital (still and/or video) camera that captures light in the visible spectrum, LiDAR, infrared light detector, and/or other sensors. As is known, LIDAR is a technique for transmitting scanned light pulses, which can be from a laser, for example, and measuring the time of flight of the pulses to determine 3D range or distance to points in the surrounding real world. Further as is known, a camera can capture two-dimensional digital images comprised of pixels. In general, the imaging device 38 captures conventional images in the visible light spectrum, and/or captures images outside of the visual spectrum, for example an infrared image showing detected temperatures. The captured images are converted to electronic information to be transmitted and stored in the memory 46 of the drone computer 22.

The drone sensors 40 collect and send data to the drone computer 22. The drone sensors 40 may detect internal states of the drone 20, for example the speed of the propeller motors, the charge level and/or voltage of the drone power source 28, the pressure applied with the electrically conductive end effectors 24, such as via the tactile sensor 40p, the voltage across the first and second electrically conductive end effectors 24, etc. The drone sensors 40 may detect the position or orientation of the aerial drone 20, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The drone sensors 40 may detect the external world, for example, light measurement sensors, photometers, wind speed measurement sensors, radar sensors, scanning laser range finders, light detection and ranging (LIDAR) devices, and image processing sensors such as cameras.

The drone computer 22 is a computing device that includes the drone processor 44 and the drone memory 46.

The drone processor 44 is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The drone processor 44 is programmed to process the data and communications received via the drone sensors 40, the imaging device 38, the transceiver 37, the drone navigation device 34, the drone memory 46, etc. Processing the data and communications may include processing to apply a load voltage to the vehicle 50 via the first and second electrically conductive end effectors 24. Processing the data and communications may include processing to perform the processes described herein, such as those described in processes 500 and 600, and data collected from sensors and communications.

The drone memory 46 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The drone memory 46 may store instructions for performing the processes described herein, such as those described in the processes 500 and 600, and data collected from sensors and communications.

The Vehicle

The vehicle 50 may include any passenger or commercial automobile such as a car, a truck, a sport utility vehicle, a crossover vehicle, a van, a minivan, a taxi, a bus, etc. In some possible approaches, the vehicle 50 is an autonomous vehicle that can operate in an autonomous (e.g., driverless) mode, a partially autonomous mode, and/or a non-autonomous mode. The vehicle 50 may include, vehicle sensors 52, a vehicle navigation device 54, a vehicle 50 communications network 56, a vehicle power source 58, a plurality of electrically conductive jump start charge points 60, a hood 62, a starter motor 64 and a vehicle computer 66.

The vehicle sensors 52 may detect internal states of the vehicle 50, for example, wheel speed, battery charge and/or voltage level, wheel orientation, tire pressure, and engine and transmission variables. The vehicle sensors 52 may detect the position or orientation of the vehicle 50, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle sensors may detect the external world, for example, light measurement sensors, photometers, wind speed measurement sensors, radar sensors, scanning laser range finders, light detection and ranging (LIDAR) devices, and image processing sensors such as cameras.

The vehicle navigation device 54 determines a location of the vehicle 50 relative to stored map data. Map data may include roads and related data, such as a number of lanes and availability of a shoulder, parking lot, and public rest area locations, etc. To determine the location, the vehicle navigation device 54 may rely on information from a global navigation satellite system, distance data from vehicle sensors 52 attached to a drivetrain of the vehicle 50, a gyroscope, and/or an accelerometer. The map data may be stored locally, such as on the vehicle memory 70, or on the vehicle navigation device 54. Additionally or alternatively, the map data may be stored on a remote computer or network, accessible via the vehicle 50 communications network 56. Exemplary vehicle navigation devices 54 include known GPS (global positioning system) navigation devices, personal navigation devices, and automotive navigation systems.

The vehicle 50 communications network 56 includes hardware, such as a communication bus, an antenna, circuits, chips, etc., for facilitating wired or wireless communication among the vehicle components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The vehicle 50 transceiver 57 is implement as described above for the drone transceiver 37. The transceiver may communicate with other vehicles, e.g., the aerial drone 20 and the server computer 16, etc., directly, such as via RF communications, and/or indirectly, such as via the network 18.

The vehicle power source 58 provides electricity to the vehicle computer 66 and the starter motor 64. The vehicle power source 58 may be a battery, for example, lithium-ion batteries, nickel-metal hydride batteries, lead-acid batteries, or other device capable of rec ng, storing, and proving electrical energy.

The plurality of electrically conductive jump start charge points 60 enable a load voltage from a remote power supply, such as the drone power source 28, to be applied to the vehicle 50, such as to the vehicle power source 58. One of the charge points 60 is in electrical communication with a positive terminal of the vehicle power source 58. Another of the charge points 60 is in electrical communication with a negative terminal of the vehicle power source 58 and/or a ground of the vehicle 50. Exemplary charge points include positive and negative battery terminals, electrically conductive posts wired to the battery terminals, grounded vehicle components, such as a frame of the vehicle, etc.

The charge points 60 may be covered with an insulating cover to protect the charge points 60 and prevent accidental contact with a conductive material that could short-circuit electrical components of the vehicle 50. For example, the charge points 60 may be covered with a slip on rubber sleeve, a hinged plastic housing, etc.

The hood 62 provides an aesthetic and protective cover to an engine and other vehicle components housed with an engine bay of the vehicle 50. The hood 62 is movable between an open and a closed position. The hood 62 may include electromechanical components, such as a linear actuator, hydraulic piston, rack and pinion, etc., configured to actuate, e.g., in response to a command from the vehicle computer 66, to move the hood 62 between the open and closed position.

The starter motor 64 provides torque to rotate a crankshaft of the engine of the vehicle 50. For example, the starter motor 64 may be an electric motor connected to the crankshaft via one or more gears, chains and sprockets, belts and pulley wheels, shafts, etc. The starter motor 64 may actuate to rotate the crankshaft, e.g., in response to a command from the computer 66. For example, the starter motor 64 may include a starter solenoid that is actuated by the vehicle computer 66 to provide electricity from the vehicle power source 58 to the starter motor 64.

The vehicle computer 66 is a computing device that includes a vehicle processor 68 and a vehicle memory 70.

The vehicle processor 68 is implemented as described above for the processor 44. The vehicle processor 68 is programmed to process the data received via the vehicle 50 communications network 56, the vehicle memory 70, the vehicle navigation device 54, etc. Processing the data and communications may include processing to perform the processes described herein, such as those described in process 700.

The vehicle memory 70 is implemented as described above for the memory 46. The vehicle memory 70 may store instructions for performing the processes described herein, such as the processes 500 700, and data collected from sensors and communications. The vehicle memory 70 may store charge point specifications. The charge point specifications includes an indication of the locations of the charge points 60 for connecting to the vehicle 50 to provide power to the vehicle power source 58. The charge point specifications may include an image, coordinates, etc., to indicate such locations.

The vehicle computer 66 is in electronic communication with one or more input devices for providing data to the vehicle computer 66 and one or more output devices, e.g., on the communication network 56, for receiving data and/or instructions from the vehicle computer 66 e.g., to actuate an output device. Exemplary input devices include: human machine interfaces (HMIs) such as a switch or graphical user interface (GUI); imaging devices such as LiDAR, still and/or video cameras, infrared sensors, the sensors 52, the navigation device 54, the transceiver 57, etc., as well as other sensors and/or electronic control units (ECUs) that are known to provide data, e.g., on communication network 56, such as, radar, ultrasonic sensors, accelerometers, gyroscopes, pressure sensors, thermometers, barometers, altimeters, current sensing devices, voltage sensing devices, microphones, light sensors, etc. etc. Exemplary output devices that may be actuated by the vehicle computer 66 include: HMIs, the navigation device 54, the transceiver 57, the power source 58, the hood 62, the starter 64, etc.

Process

Figure 5:
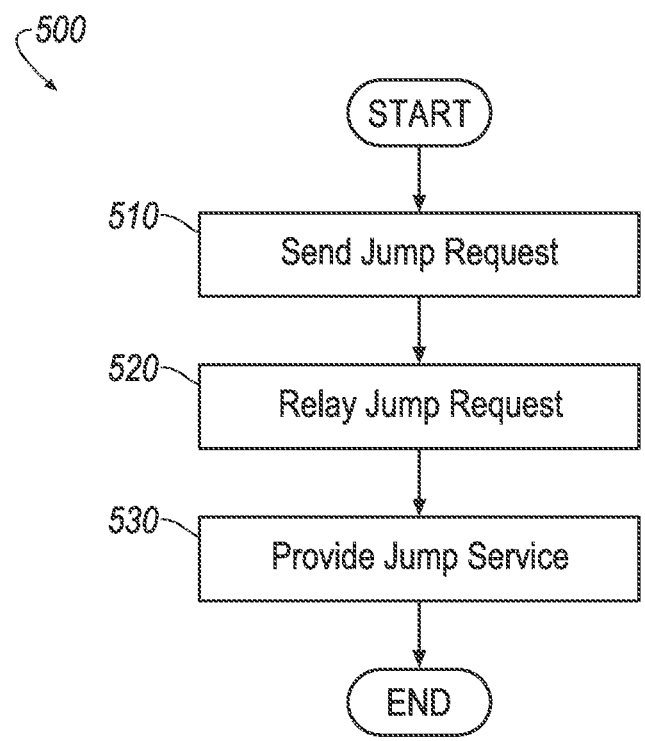
FIG. 5 is a flow chart of an example process of controlling a jump start delivery system.

FIG. 5 is a process flow diagram illustrating an exemplary process 500 for controlling the vehicle jump start system 10 to provide the vehicle 50 with an electric power source. The process 500 begins in a block 510 when the vehicle computer 66 identifies that the vehicle power source 28 has insufficient charge, as further described below. Upon such identification, the vehicle computer 66 causes a jump request to be sent, e.g. via the network 18 to the server computer 16. As used herein, "jump start request" means a communication, e.g., from the vehicle 50 and/or the server computer 16 requesting that the drone 20 proceed to a specified location to provide electricity to the vehicle 50 at the specified location. The jump start request may include a location of the vehicle 50, specified charge points 50, a landing or hovering location on the vehicle 50, and vehicle identification information. The landing location may include an image for comparison or other instruction, e.g., front left of engine bay, indicating to the drone 20 a location for landing or hovering during the jump service, e.g. on an engine component cover, a portion of the vehicle frame of body, etc. Further details of an example of the vehicle 50 requesting a jump start are provided below with respect to the process 700 of FIG. 7.

Next, at a block 520 the server computer 16 relays the jump start request. The server computer 16 may receive the jump start request and send the jump start request to a specific drone out of a fleet for drones, e.g. based at least on the location of the vehicle 50. For example, the server computer 16 may send the jump start request to the drone 20 that is the shortest travel distance, e.g., flight distance taking into account no fly zones, from the vehicle 50, e.g., based on the drone fleet database.

Next, at a block 530 the drone 20 provides a jump service to the vehicle 50 in response to receiving the jump start request. For example, the drone 20 navigates to the location of the vehicle 50, e.g., as specified in the jump start request. Upon arrival at the location, the drone 20 may establish a communicative connection with the vehicle 50, e.g., directly with the drone transceiver 37 and vehicle transceiver 57, or indirectly via the network 18. To enable such connection, the drone computer 22 may address communications to the vehicles 50, e.g., based on the vehicle identification information included in the jump start request. The drone 20 and the vehicle 50 communicate with each other to perform the jump start on the vehicles 50, as further described below, e.g., to open the hood 62 of the vehicle 50, to crank the engine of the vehicle 50 with the conductive end effectors 24 electrically connected to the charge points 60, to terminate to the electrical connection, etc. While the drone 20 performs the jump start it may hover proximate the vehicle 50, e.g. in an area above the engine bay and below the hood 62. Additional support may be provided to the drone 20 during the jump start, e.g., the robotic arms 26 may support at least a portion of drone 20 weight, e.g., via the claws 42 gripping the charge points 60 such that drone 20 weight may be transferred to the vehicle 50 via the arms 26. Alternatively or additionally, the drone 20 may land while performing the jump start, e.g., on the engine component cover, portion of the frame or body, etc., such as that included in the jump start request. After performing the jump start the drone 20 returns to its home location. More details concerning how the drone 20 could respond to a jump start request are provided below with respect to the process 600 of FIGS. 6A and 6B. After the block 530, the process 500 ends.

Figure 6A:
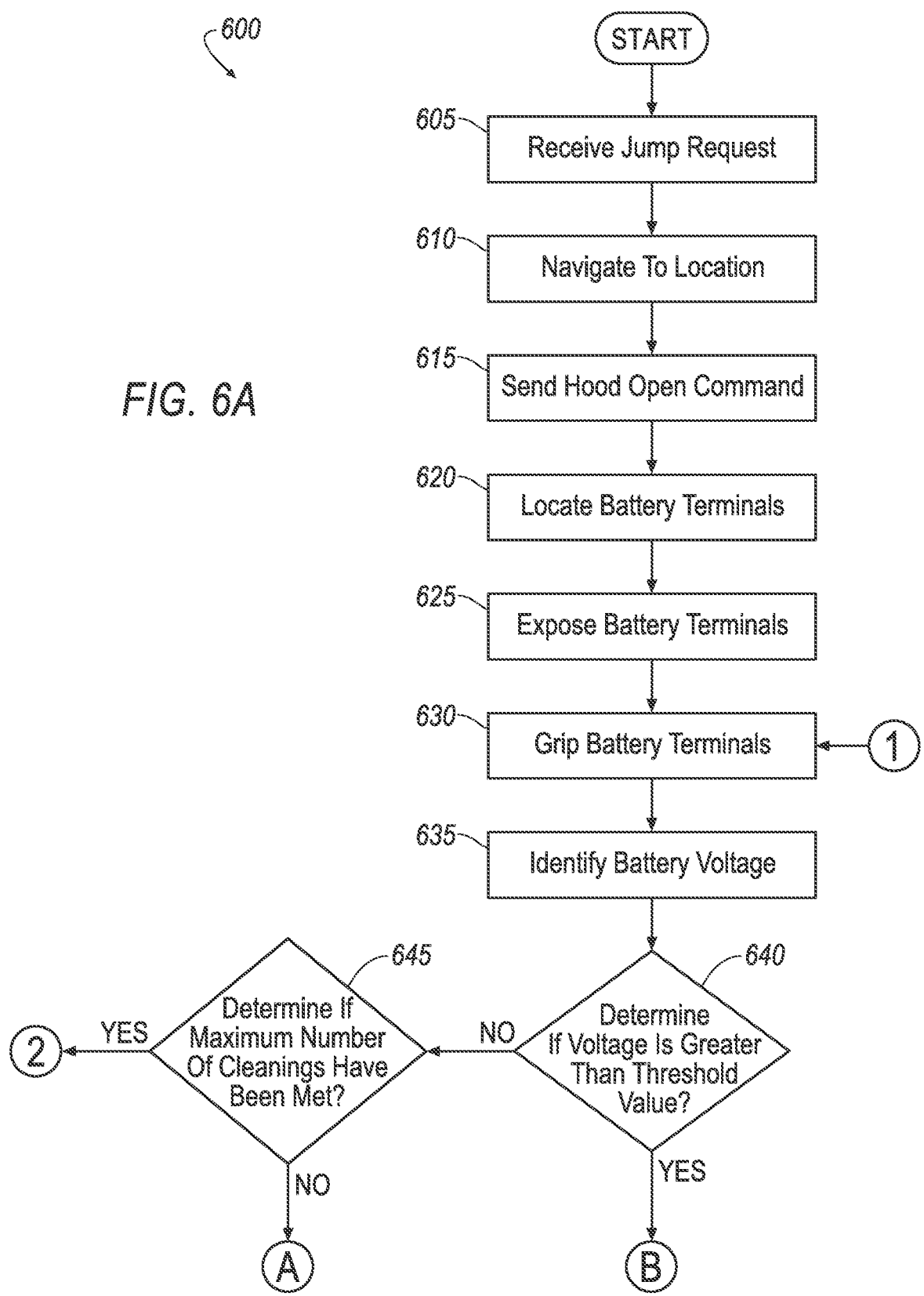
FIGS. 6A and 6B are a flow chart of an example process of controlling an aerial drone to provide a jump start.
Figure 6B:
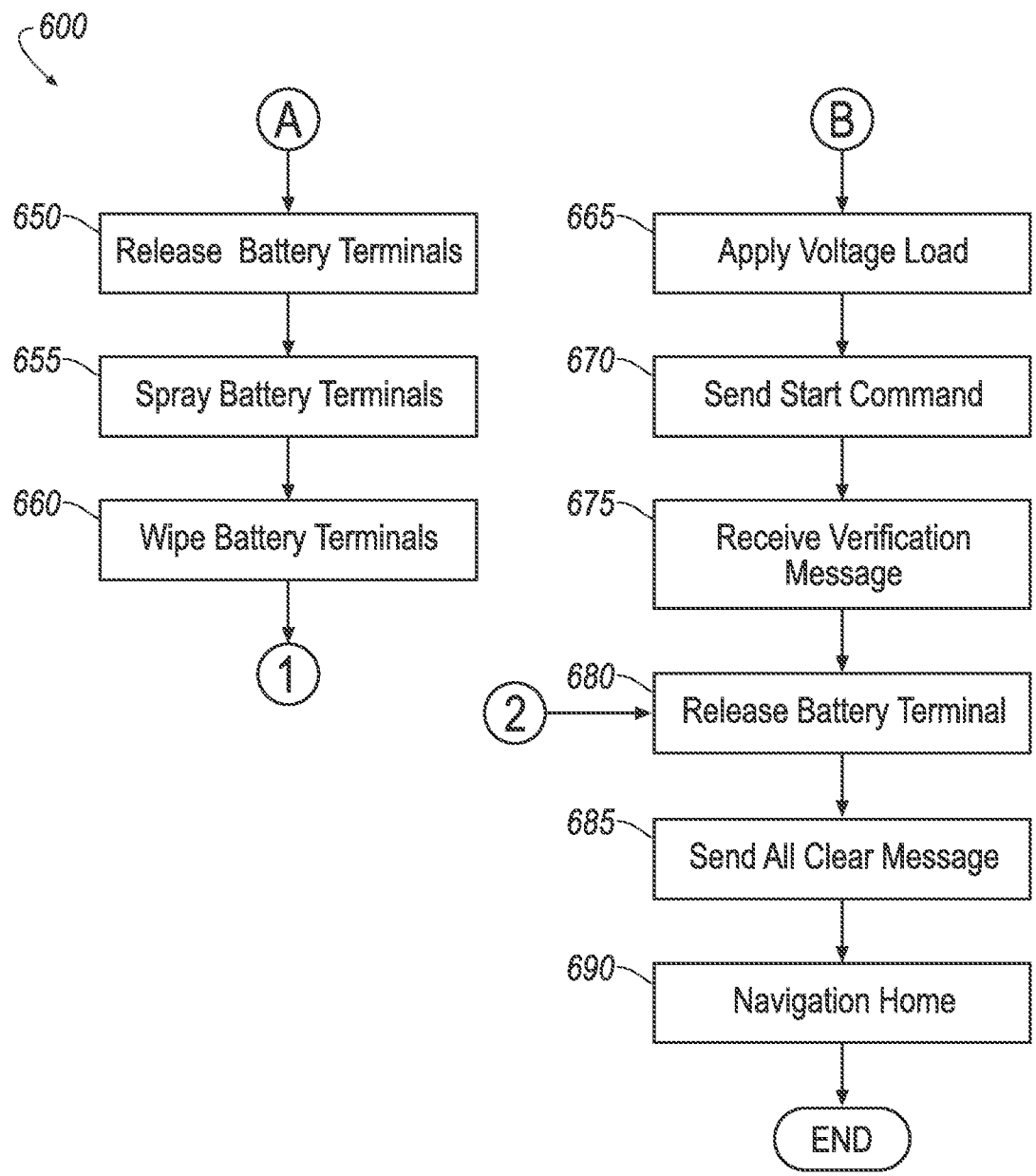

With reference to FIGS. 6A and 6B, a process 600 for controlling the aerial drone 20 to provide the electricity to the vehicle 50 may begin in a block 605 when the drone computer 22 receives the jump start request. The jump start request may be received via the network 18, e.g. from the vehicle 50 or the server computer 16. The jump start request may include the location of the vehicle 50, e.g., a latitude and longitude coordinate location and/or a location relative to map data received from the navigation device 34, specified charge points (e.g., a specification of charge point 60 on a vehicle 50, including, implicitly or explicitly, its location, such as "battery posts" or "under hood front left side," an image of the charge points, etc.), and vehicle identification information, e.g., a unique name, email address, network address, etc., associated with the vehicle 50.

Next, at a block 610 the drone computer 22 navigates the drone 20 to the location of the vehicle 50. For example, the drone computer 22 typically provides the location of the vehicle 50, e.g., from the charge request, to the drone navigation device 34. The drone computer 22 may then actuate the propeller motors to navigate the aerial drone 20 to the location of the vehicle 50 based at least on information received from the drone navigation device 34.

Next, at a block 615 the drone computer 22 sends the hood open command. For example, the drone computer 22 may instruct the drone 20 communications network 36 to send the hood open command. The hood open command may be addressed to the vehicle 50, e.g. by including the vehicle identification information.

Next, at a block 620 the drone computer 22 locates the first and second electrically conductive charge points 60 on the vehicle 50. The drone computer 22 may locate the charge points 60 using the drone imaging device 38, such as analyzing the image from the imaging device 38 using known algorithms and image processing techniques. The drone computer 22 may locate the charge points 60 based at least on charge point data included in the jump start request. For example, the jump start request may specify a type of charge point location 60, e.g., a battery post, whereupon the drone computer 22 may compare a stored image of battery posts, possibly for a specific make and model of the vehicle 50 which may also be specified in the jump start request, to one or more images received from device drone 20 imaging sensor 52 of the vehicle 50 to locate the battery post charge points 60.

Next, at a block 625 the drone computer 22 removes an insulating cover, if present, to expose at least one of the charge points 60. For example, the drone computer 22 may send a command to the robotic arm 26 to move the conductive end effector 24 and claws 42 to grip, remove, and release the cover.

Next, at a block 630 the drone computer 22 actuates the electrically conductive end effectors to contact the charge points 60. For example, the drone computer 22 may send a command to the robotic arm 26 supporting the conductive end effector 24 to position the claws 42 over the charge point 60. The drone computer 22 may then send a command to the conductive end effector 24 to actuate movement of the claws 42 toward a closed position to grip the charge point 60. The grip on the charge point 60 may be verified by the drone computer 22 based on information received from the tactile sensor 40*p*, such as the tactile sensor 40*p* indicating that a certain pressure, e.g. 2 lb./square inch, is being applied by the claws 42 at a certain degree of being fully opened or closed, e.g. 80% actuated to a fully closed position, i.e., a fully closed position being where the tips of end effector 24 claws 42 are touching one another, and fully opened being when the claws 42 are moved as far apart as possible according to their design. Actuating the first and second end effectors 24 to grip the first and second charge points 60 on the vehicle 50 may be executed by the drone computer 22 after sending the hood open command to the vehicle in the block 615. Actuating the first and second end effectors 24 to grip the electrically conductive first and second charge points 60 may be executed after removing the insulating cover from at least one of the first charge point and the second charge point.

Next, at a block 635 the drone computer 22 identifies a voltage of the vehicle 50 power source 58. The drone computer 22 may identify the voltage of the power source 58 with the drone sensors 40 and conductive end effectors 24. For example, while the conductive end effectors 24 are contacting the charge points 60, the drone sensor 40, such as a voltmeter, may measure the voltage across the charge points 60, e.g., across the conductive end effectors 24.

Next, at a block 640 the drone computer determines whether the voltage of the vehicle 50 is greater than a threshold value, e.g., 1 volt. To determine whether the voltage of the vehicle 50 is greater than the threshold value, the drone computer 22 may compare the voltage of the vehicle 50, such as the voltage identified in the block 635, with the threshold value. The threshold value may be determined by a manufacturer of the aerial drone 20, and stored on the drone memory 46. When the voltage of the vehicle 50 is not greater than the threshold value the process 600 moves to a block 645. Else, the process 600 moves to a block 665.

At the block 645 the drone computer 22 determines if a threshold maximum number of charge point 60 cleanings, e.g. 3, have been performed. Determining whether the maximum number of cleanings has been performed may be executed after determining the voltage of the vehicle 50 is not greater the threshold voltage value. The threshold maximum number of cleanings may be determined by a manufacturer of the aerial drone 20, and stored in the drone memory 46. The threshold maximum number of cleanings may be determined based on a fluid capacity of the spray device 32. To determine whether the threshold maximum number of cleanings have been attempted the drone computer 22 may store the number of cleanings performed since receiving the jump start request at the block 705, such as on the drone memory 46. The number of performed cleanings may be compared the to the threshold maximum number of cleanings. When the attempted number of cleaning is less than the threshold maximum number of cleanings, the process 600 moves to a block 650. Else, the process 600 moves to a block 680.

At the block 650, which may follow the block 645, the drone computer 22 releases the grip on the charge points 60. For example, the drone computer 22 may send a command to the end effectors 24 instructing the end effectors 24 to actuate the claws 42 to an open, e.g., fully open, position.

Next, at a block 655 the drone computer 22 actuates the spray device 32 on the aerial drone 20 to spray at least one of the electrically conductive end effector charge points 60. For example, the drone computer 22 may send a signal to the robotic arm 26 supporting the spray device 32 to position the spray device 32 to aim at the charge point 60. The drone computer 22 may then send a command to the spray device 32 to spray, such as actuating the valve of the spray device 32 open.

Next, at a block 660 the drone computer 22 actuates the abrasive tool 30 on the aerial drone 20 to wipe at least one of the electrically conductive end effector charge points 60 on the vehicle 50. For example, when the abrasive tool 30 is the end effector with the ridged gripping surface, the drone computer 22 may send a command to the robotic arm 26 supporting the abrasive tool 30 to position the abrasive tool 30 over the charge point 60. The drone computer 22 may then send a command to the end effector with the ridged gripping surface to close on the charge point 60. Next, the drone computer 22 my send a command to the robotic arm 26 to rotate the end effector with the abrasive surface about the charge point 60. In another example, when the abrasive tool is the wire brush or wheel, the drone computer 22 may actuate the robotic arm 26 to scrub the charge point 60 with wire bristles of the brush or wheel. The drone computer 22 may actuate the abrasive tool 30 on the aerial drone 20 to wipe at least one of the electrically conductive end effector charge points 60 in response to determining the voltage of the vehicle 50 is below the threshold value, such as at the block 640.

At the block 665, which may follow the block 640, the drone computer 22 applies a load voltage to the vehicle 50 via the first and second electrically conductive end effectors 24 that are mounted to the aerial drone 20. For example, the drone computer 22 may control the flow of electric power between the drone power source 28 and the conductive end effectors 24, the drone computer 22 permitting electric power to flow between the drone power source 28 and the conductive end effectors 24 while the conductive end effectors 24 are gripping the charge points 60. The load voltage may be applied in response to determining that the voltage is at or above the threshold value, such as at the block 640.

Next, at a block 670, after applying the load voltage, the drone computer 22 may send a start command to the vehicle 50. For example, the drone computer 22 may command the drone 20 transceiver 37 to send such command. The drone computer 22 may send the start command to the vehicle 50 while the load voltage is being applied, such as while performing the block 765.

Next, at a block 675 the drone computer 22 receives the engine start verification message. For example, the engine start verification message may be received with the drone 20 transceiver 37, and communicated to the drone computer 22 via the network 36. The engine start verification message may be sent from the vehicle 50, e.g. via the transceiver 37.

At a block 680, which may follow the block 645 or the block 675, the drone computer 22 releases the grip on the charge points 60. To release the grip on the charge points 60, the drone computer 22 may actuate the conductive end effectors 24 to the open position, such as by the drone computer 22 sending a command to conductive end effectors 24 to actuate the claws 42.

The drone computer 22 may release the grip on the charge points 60 in response to determining the maximum number of cleanings has been performed, such as at the block 645. The drone computer 22 may release the grip on the charge points 60 in response to receiving the start verification, such as at the block 675. The drone computer 22 may release the grip on the charge points 60 after receiving the start verification and upon determination that a power level of the drone power source 28 is above a threshold, e.g., 8 volts. For example, providing the jump start may deplete the power source 28 to such extent that the drone 20 is unable to navigate to another destination. After the vehicle 50 has started, the drone 20 may continue to be connected to the charge points 60 to receive a charge from the vehicle power source 58 until the threshold is met.

At a block 685 the drone computer 22 sends the all clear message. For example, the drone computer 22 may command the drone 20 transceiver 37 to send a wireless message to the vehicle 50.

At a block 690 the drone computer 22 navigates to a specified destination, e.g., according to instructions from the server 16, according to a stored home location, etc. For example, the home location, such as a latitude and longitude coordinate location, or a location relative to map data, may be stored on the drone memory 46 or the drone navigation device 34. The drone computer 22 may send a command to actuate the propeller motors to navigate the aerial drone 20 based at least on information received from the drone navigation device 34. After the block 690, the process 600 ends.

Figure 7:
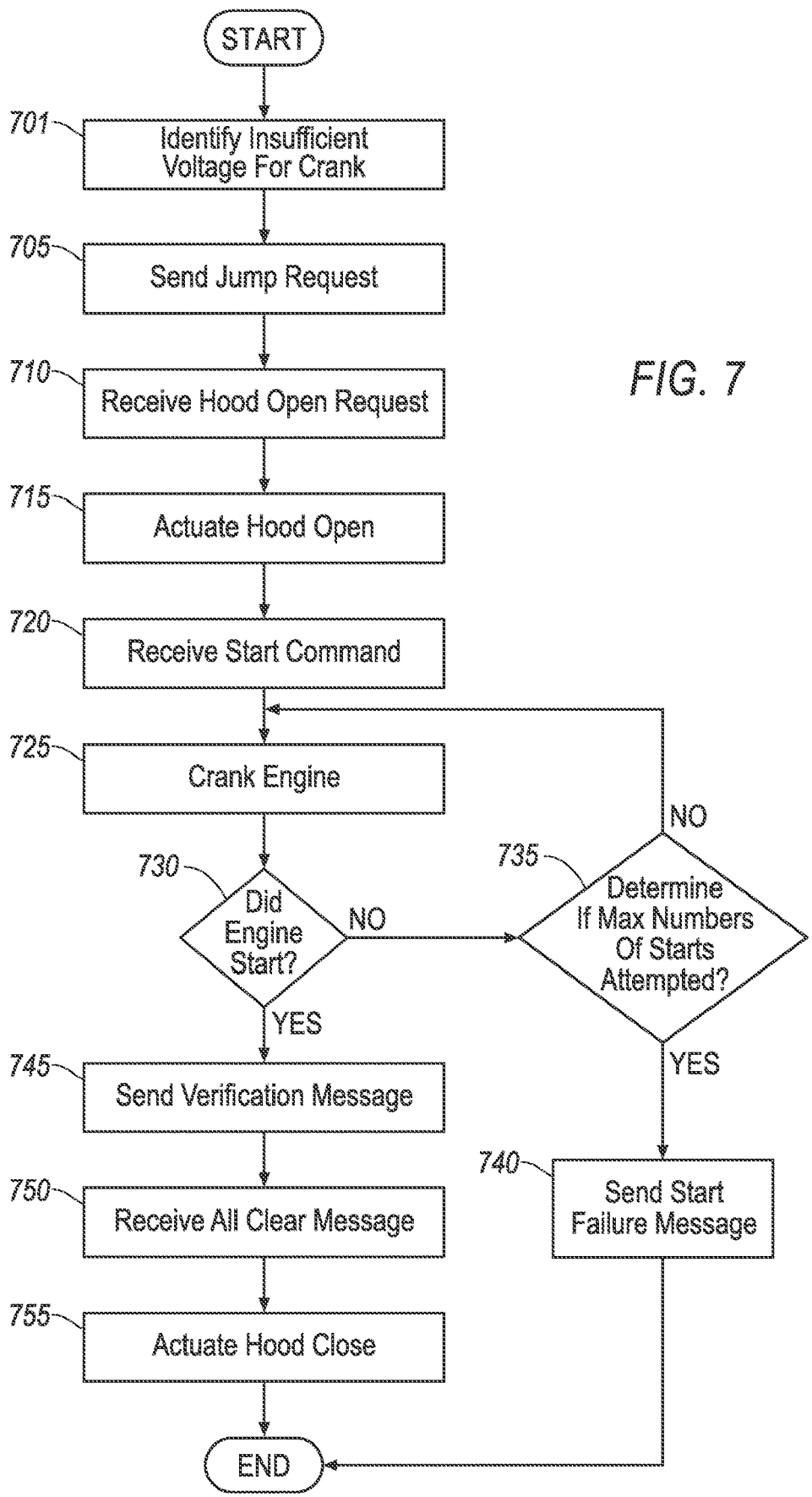
FIG. 7 is a flow chart of an example process of controlling a vehicle to receive a jump start.

With reference to FIG. 7, a process 700 for controlling the vehicle 50 to receive a jump start from the aerial drone 20 may begin in a block 701 when the vehicle computer 66 identifies that the vehicle power source 28 has insufficient charge to crank the starter motor 64. For example, the vehicle computer 66 may compare a measured voltage of the vehicle power source 28 with a threshold value, e.g. 9 volts. Additionally or alternatively, the process 700 may begin when requested by a user through a vehicle HMI, or when requested by a remote computing device, e.g., a user device in communication with the vehicle computer 66 via the vehicle 50 transceiver 57.

Next, at a block 705 the vehicle computer 66 sends a jump start request. The jump start request may be sent with the vehicle transceiver 57 via the network 18. The jump start request may include the location of the vehicle 50 and the specification of the charge points 60. For example, the computer 66 may receive the vehicle 50 location, such as a latitude and longitude location, a location relative to map data, etc., from the vehicle sensors 52, and/or the vehicle navigation device 54. The specification of the charge points 60 be stored in the memory 70, e.g., by a manufacturer of the vehicle 50.

Next, at a block 710, the vehicle computer 66 receives a hood open command, e.g., from the aerial drone 20. For example, the vehicle computer 66 may receive the hood open command via the vehicle 50 transceiver 57 from the aerial drone 20.

Next, at a block 715, the vehicle computer 66 actuates the hood 62 to the open position. For example, the vehicle computer 66 may send a command to the hood 62 via the transceiver 57. The vehicle computer 66 may actuate the hood 62 to the open position in response to receiving the hood open command at the block 710.

Next, at a block 720 the vehicle computer 66 receives a start command e.g., from the aerial drone 20. For example, the vehicle computer 66 may receive the start command via the vehicle 50 transceiver 57 from the aerial drone 20.

Next, at a block 725 the vehicle computer 66 actuates the starter motor 64 to crank the engine of the vehicle 50. For example, the vehicle computer 66 may send a command or voltage load via the communication network 56 to the starter motor 64.

Next, at a block 730 the vehicle computer 66 determines whether the engine has started. For example, the vehicle computer 66 may determine whether the engine has started based at least on information received from the vehicle sensors 52 via the communication network 56, such as comparing a measured rotation rate of the engine to a threshold value, e.g. 1000 rotations per minute. When the rotation rate of the engine is at or above the threshold value the vehicle computer 66 may determine the engine has started. Similarly, when the rotation rate of the engine is below the threshold value the vehicle computer 66 may determine the engine has not started. Upon determination that the engine has not started, the process 700 moves to a block 735. Upon determination that the engine has started, the process 700 moves to a block 740.

At the block 735 the vehicle computer 66 determines whether a threshold maximum number of engine starts, e.g. 5, have been attempted. The threshold maximum number of engine start attempts may be determined by a manufacturer of the vehicle 50, and stored on the vehicle memory 70. To determine whether the threshold maximum number of engine starts have been attempted the vehicle computer 66 may store the number of attempted engine starts since receiving the start command, such as on the vehicle memory 70. The number of engine starts may be compared the to the threshold maximum number of engine starts. When the attempted number of engine starts is greater than the threshold maximum number of engine starts, the process 700 may move to a block 740. Else, the process may return to the block 725.

At the block 740, which may follow the block 730, the vehicle computer 66 sends a start failure message. The start failure message may be sent with the vehicle 50 communications network 56, e.g., the vehicle computer 66 may send an instruction via the communication network 56 to the vehicle 50 communications network 56 to send the start failure message. After sending the start failure message the process 700 may end.

At the block 745 the vehicle computer 66 sends the engine start verification message to the drone 20. The engine start verification message may be sent via the vehicle 50 communications network 56. The engine start verification message may be sent in response to determining the engine has started, such as the determination in the block 730.

At a block 750 the vehicle computer 66 receives an all clear message from the drone 20. The vehicle computer 66 may receive the all clear message via the vehicle 50 communications network 56. For example, the all clear message may be received from the aerial drone 20, such as the all clear message sent from the aerial drone in at the block 685, discussed above.

At a block 755 the vehicle computer 66 actuates the hood 62 to the closed position. For example, the vehicle computer 66 may send a command to the hood 62 via the communication network 56. The vehicle computer 66 may actuate the hood 62 to the closed position in response to receiving the all clear message, such as that received at the block 750. After actuating the hood 62 to the closed position, the process 700 ends.

Conclusion

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
   an aerial drone including first and second electrically conductive end effectors electrically connected to a power source; and
   a vehicle computer programmed to send a jump start request, the jump start request including a location of the vehicle and a jump start charge point specification.

2. The system of claim 1, the aerial drone further including a tactile sensor positioned on one of the first or the second electrically conductive end effectors.

3. The system of claim 1, the aerial drone further including a spray device.

4. The system of claim 1, the aerial drone further including an abrasive tool.

5. The system of claim 1, wherein the vehicle computer is programmed to actuate a starter motor in response to receiving a start command from the aerial drone.

6. The system of claim 1, wherein the vehicle computer is programmed to actuate a hood to an open position in response to receiving a hood open command from the aerial drone.

7. The system of claim 1, further comprising a drone computer programmed to apply a load voltage to a vehicle via the first and second electrically conductive end effectors mounted to an aerial drone.

8. A computer, comprising programing to:
   to actuate first and second electrically conductive end effectors mounted to an aerial drone to grip first and second jump start charge points of a vehicle; and
   apply a load voltage to the vehicle via the first and second electrically conductive end effectors.

9. The computer of claim 8, further programmed to actuate an abrasive tool mounted to the aerial drone to wipe a jump start charge point of the vehicle.

10. The computer of claim 8, further programmed to actuate a spray device mounted to the aerial drone to spray a jump start charge point of the vehicle.

11. The computer of claim 8, further programmed to navigate the aerial drone to a location of the vehicle included in a jump start request received by the aerial drone.

12. The computer of claim 8, further programmed to send a hood open command to the vehicle.

13. A method comprising:
   actuating first and second electrically conductive end effectors mounted to an aerial drone to grip first and second jump start charge points of a vehicle; and
   applying a load voltage to the vehicle via the first and second electrically conductive end effectors.

14. The method of claim 13, further comprising wiping at a jump start charge point of the vehicle with an abrasive tool mounted on the aerial drone.

15. The method of claim 13, further comprising spraying a jump start charge point of the vehicle with a spray device mounted on the aerial drone.

16. The method of claim 13, further comprising navigating the aerial drone to a location of the vehicle included in a jump start request received by the aerial drone.

17. The method of claim 13, further comprising sending a hood open command to the vehicle.

* * * * *